(No Model.)

W. TUCKER.
FILE AND METHOD OF CUTTING THE SAME.

No. 320,899. Patented June 23, 1885.

WITNESSES
Ed. A. Newman
Cel. C. Newman

INVENTOR
William Tucker.
By his Attorney
Fr. L. Ewin.

UNITED STATES PATENT OFFICE.

WILLIAM TUCKER, OF EAST BROOKFIELD, MASSACHUSETTS.

FILE AND METHOD OF CUTTING THE SAME.

SPECIFICATION forming part of Letters Patent No. 320,899, dated June 23, 1885.

Application filed May 29, 1884. (No model.)

*To all whom it may concern:*

Be it known that I, WILLIAM TUCKER, a citizen of the United States, residing at East Brookfield, in the State of Massachusetts, have invented a new and useful Improvement in the Art of Cutting or Toothing Saw-Files, of which the following is a specification.

The present invention relates exclusively to the production of those saw-files, whether circular for use in rotary tool saw-filing machines, or straight for use in machines or by hand, which are distinguished by cutting-edges, (one or more,) each presenting two faces at an angle of sixty degrees or thereabout, both of which, together with the intervening salient "corner," are cut or toothed. By "saw-files" as hereinafter used this kind of files will be understood; and the present invention relates exclusively to that distinct art commonly termed "file-cutting." The blanks may be shaped and prepared, and the cut or toothed files may be hardened, by any approved method and means, and the files used or mounted for use in any approved way. Heretofore each edge of such files has been commonly cut or toothed at three distinct file-cutting operations, one for each face and one for the corner. The teeth formed thus in long ridges on the faces answer very well; but the relatively short teeth of the corner, exposed to the severest work, and disconnected from those of the faces, are invariably the first to wear out, although cut of extra depth, owing to the weakening of the steel at the corner by the three cuttings, and the fact that these corner-teeth receive no support from those on the faces. Moreover, the entire length of each edge must be gone over three times with the possibility of mishaps each time.

This invention consists in providing such saw-files with cuts or teeth extending continuously in or on and over both faces and the corner of each edge, with the teeth preferably deepest at the corner, as heretofore, and in a particular method of doing this whereby the edge and the whole file in the case of circular files is chisel-cut, so as to be thus "continuous-toothed," as I term it, in one-third of the time heretofore required to produce the inferior old teeth, whether the file-cutting be by machine or by hand, as hereinafter set forth.

A sheet of drawings accompanies this specification as part thereof.

Figure 1:
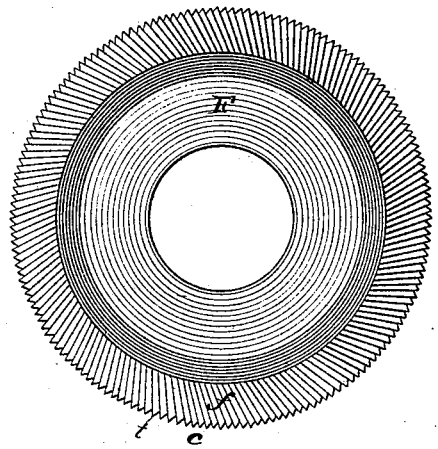
Figure 2:
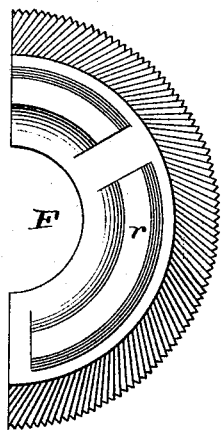
Figure 3:
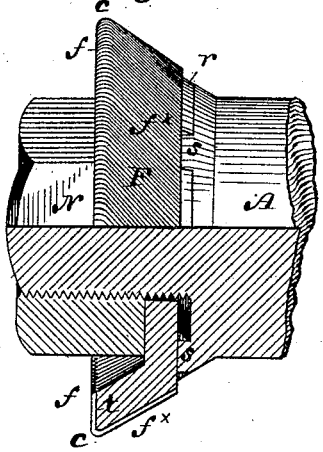
Figure 4:
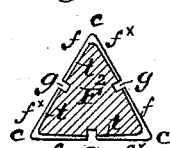
Figures 5, 7:
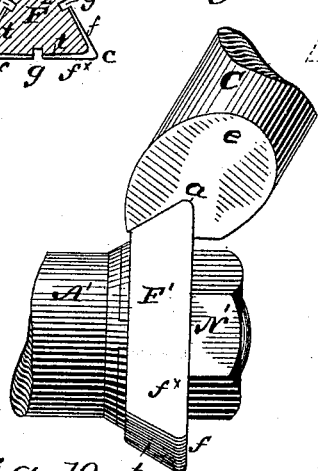
Figure 8:
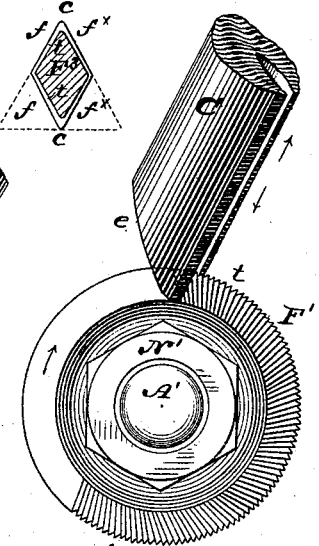
Figures 9, 10:
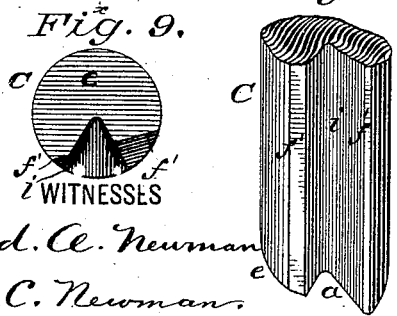
Figures 11, 12:
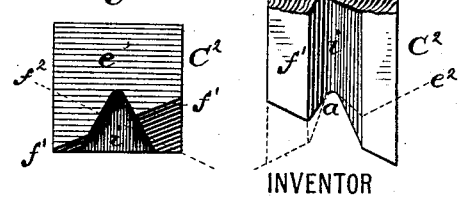

Figure 1 of these drawings is a face view, and Fig. 2 a half-back view, of a continuous-toothed circular saw-file illustrating this invention. Fig. 3 is a side view of the same, half in section, as mounted upon its arbor in a saw-filing machine. Figs. 4 and 5 are cross-sections of continuous-toothed straight files, and Figs. 6 to 12, inclusive, are views of the blank of said circular file shown in Figs. 1, 2, and 3 as mounted in file-cutting machines, and of chisels for cutting continuous-toothed files in the manner aforesaid, drawn on a smaller scale, Figs. 6 and 7 being elevations of the file-blank and chisel with the file-arbor at an angle and horizontal in the respective figures; Fig. 8, a view of the same as seen in Fig. 7 from a point of vision at right angles to that of this figure; Fig. 9, an end view, and Fig. 10 a face view, of the "round" chisel represented in Figs. 6, 7, and 8; and Figs. 11 and 12, respectively, end and face views of a "square" chisel of substantially equivalent construction, illustrating modifications.

Like letters of reference indicate corresponding parts in the several figures.

In cutting or toothing the said circular file F or either of the said straight files $F^2$ $F^3$, or any other style of saw-file coming within the class hereinbefore defined, the respective faces $f f^x$ and corner $c$ of its cutting-edge or each cutting-edge thereof are together provided with teeth $t$, common to all, extending continuously from face to face, and preferably deepened at the corner, as clearly shown in the sectional views, Figs. 3, 4, and 5, said teeth being formed on the respective faces at suitable angles and of proper depth or depths, and otherwise adapted to particular work, according to the judgment of the file-maker.

A saw-file of the above description—that is to say, a "continuous-toothed" saw-file, as I have termed it—has never before been produced in any way, so far as I am informed, and said novel style of cutting or toothing is to be considered the only essential feature of the first part of this invention.

Certain ancillary features of the files represented by the drawings may be described as follows: The corners C are shown rounded. This is preferred, but is in no sense essential in continuous-toothed files, and is known to be old. Said circular file F has been constructed with a radially-notched rib, $r$, Figs. 2 and 3, on its back, its arbor A, Fig. 3, being provided at its file-holding end with strong studs $s$, fitted to said notches, so as to preclude torsional or angular displacement of the file after the latter is clamped fast by a screw-nut, N, as shown. This construction and combination of parts is utilized in the particular method of file-cutting which constitutes the second part of this invention, as hereinafter set forth. Said file $F^2$, Fig. 4, is an ordinary triangular file, apart from features already mentioned and longitudinal grooves $g$, one in each side. The latter separate the respective faces $f f^x$ of each side, so that the ends of the respective teeth $t$ may terminate uniformly and without crossing each other at said grooves. Said file $F^3$, Fig. 5, is of "diamond" shape in cross-section, an excellent continuous-toothed file being so formed with two cutting-edges, as represented, out of one-half of the amount of stock which would be used in a triangular file (completed by dotted lines in the figure,) with its three edges, while the crossing of the teeth at the obtuse side corners of this form of file is not objectionable.

Figure 6:
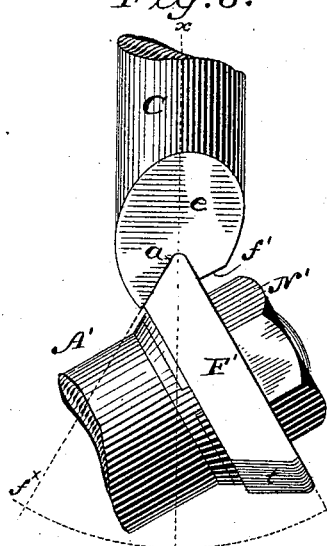

To provide for cutting or toothing my continuous-toothed files by the particular method aforesaid, I devised a bifurcated chisel, two forms of which are represented at C and $C^2$ in Figs. 6 to 12, inclusive. This chisel is readily produced by milling a V-shaped longitudinal groove or indentation, $i$, in one side of a suitable bar of steel, milling off the indented face $f'$ of the bar to regulate the depths of the respective sides of the indentation to correspond with those of the faces $f f^x$ of the file to be cut, and grinding off the end $e$ for the desired angle of cut and to sharpen the chisel, which thereafter simply requires to be ground uniformly at this point $e$ in order to keep it sharp without changing its shape or cut. An angular chisel-edge, $a$, adapted to straddle a saw-file edge, as represented in Figs. 6 or 7 and 8, and to cut both faces $f f^x$ thereof and its corner $e$ simultaneously, and the latter deepest is thus secured, being formed by the junction of the lines of said indentation $i$, face $f'$, and end $e$ of the chisel, as clearly seen in Figs. 9 and 10 or 11 and 12.

In so cutting or toothing the circular file F, for example, I proceed, as illustrated by Figs. 6, 7, and 8, as follows: The file-blank F', completed except cutting and hardening, is mounted on the holding end of an arbor A', identical with that of the arbor A, Fig. 3, by which the finished file is to be carried, and is clamped fast thereon by a nut, N'. If the chisel is to be operated by machinery, said arbor A' of the file-cutting machine may preferably be mounted at a suitable inclination, as represented in Fig. 6, so that the chisel C may work in a vertical plane. Otherwise the axis of said arbor A' may be horizontal, as represented in Figs. 7 and 8, or at any preferred inclination approaching horizontal or vertical. In either case the chisel is so applied that its axis $x$ is at equal angles to the respective faces $f f^x$ of the file, as illustrated in Fig. 6. Thus directed, its impressions in the respective faces of the file-blank are uniform, and each continuous tooth is of uniform depth at a given distance from the corner on either face. It may in some cases be desirable to depart from this, in order to give to one face more endurance than the other. If so, this can readily be accomplished. If, for example, the chisel C, as seen in Fig. 7, be directed in a plane more nearly vertical, the teeth $t$ will be deepest on the peripheral face $f^x$; or if its inclination be increased the teeth $t$ will be deeper on the face $f$. The angle of the file-faces is immaterial so long as it does not fall greatly below sixty degrees. Files of fifty-five degrees and sixty degrees have been successfully cut, and difficulty decreases as the angle increases. In the other direction, decrease of angle increases the tendency of the file edge to spread the chisel in the cutting operation. The inclinations of the chisel represented in Fig. 8—viz., those of its face $f'$ relatively to the perpendicular and to the line of the arbor-axis—are determined by the desired direction of the teeth $t$ across the respective file-faces and their shape or angle, and will be varied to suit particular uses of the continuous-toothed saw-files. Finally, the chisel C is reciprocated and the file-blank F' is continuously or intermittently rotated, as represented by arrows in Fig. 8, until the cutting or toothing operation is concluded, the teeth being uniformly spaced by mechanism or the skill of the artisan. I have so provided a circular file two inches in diameter with three hundred and twenty teeth; but the number as well as the depth and angle of the teeth of my continuous-toothed files, is variable by different file-makers.

The circular file shown at F in the drawings is the "right-cut" file of a right and left pair for my saw-filing machine patented March 11, 1884, as set forth in United States Patent No. 295,133, and the chisels C $C^2$ are milled and ground for this particular cut. For a "left-cut" file the angles of the chisel-face $f'$ and its end $e$ would be reversed relatively to those of said face and end, as shown. This is represented by dotted lines $f^2$ for the reversed face-angle and $e^2$ for the reversed end-angle in Figs. 11 and 12, and will be readily understood by skilled tool-makers.

Having thus described my said improvement in the art of cutting or toothing saw-files, I claim as my invention and desire to patent under this specification—

1. A saw-file continuous toothed, as herein specified—that is to say, having each cut or tooth formed continuously and unbrokenly in or on both faces and the corner of the file-edge or of each file-edge, substantially as and for the purposes set forth.

2. The within-described method of cutting or toothing saw-files, consisting in forming the cuts or teeth simultaneously in or on both faces and the corner of each file-edge by means of a bifurcated chisel directed so that its axis is at equal angles from the respective faces, or thereabout, substantially as illustrated, for the purposes set forth.

WILLIAM TUCKER.

Witnesses:
GEORGE E. FORBES,
HENRY M. TONER.